(12) United States Patent
Wieclawski

(10) Patent No.: US 8,840,179 B2
(45) Date of Patent: Sep. 23, 2014

(54) HINGE ASSEMBLY FOR A VEHICLE SEAT ASSEMBLY

(75) Inventor: Stanislaw Andrzej Wieclawski, Hohenkammer (DE)

(73) Assignee: Lear Corporation, Southfield, MI (US)

( * ) Notice: Subject to any disclaimer, the term of this patent is extended or adjusted under 35 U.S.C. 154(b) by 302 days.

(21) Appl. No.: 13/321,040

(22) PCT Filed: Jun. 19, 2009

(86) PCT No.: PCT/US2009/047897
§ 371 (c)(1),
(2), (4) Date: Nov. 17, 2011

(87) PCT Pub. No.: WO2012/147594
PCT Pub. Date: Dec. 23, 2012

(65) Prior Publication Data
US 2012/0068514 A1      Mar. 22, 2012

(51) Int. Cl.
*B60N 2/433*      (2006.01)
*B60N 2/36*       (2006.01)

(52) U.S. Cl.
CPC . *B60N 2/36* (2013.01); *B60N 2/433* (2013.01)
USPC ................................. 297/216.14; 297/378.11

(58) Field of Classification Search
USPC ............... 297/216.13, 216.14, 378.1, 378.11, 297/378.12
See application file for complete search history.

(56) References Cited

U.S. PATENT DOCUMENTS 3,628,831 A * 12/1971 Close ........................ 297/378.11
4,082,353 A *  4/1978 Hollowell ................. 297/378.11
4,118,067 A * 10/1978 Tanaka ...................... 297/378.11
4,399,956 A    8/1983 Mita
4,429,919 A *  2/1984 Klueting et al. ......... 297/378.11
4,720,145 A    1/1988 Bell
5,476,307 A * 12/1995 Whalen ..................... 297/378.11
5,673,971 A   10/1997 Wieclawski
6,502,903 B2 *  1/2003 Bruck et al. .............. 297/378.12
6,644,746 B2 * 11/2003 Bruck et al. .............. 297/378.11
6,860,560 B2 *  3/2005 Chiu et al. ................. 297/367 R
7,000,992 B2 *  2/2006 Armbrust et al. .......... 297/216.1
8,182,040 B2 *  5/2012 Muller et al. ............... 297/216.1
2002/0170381 A1 * 11/2002 Hansel et al. .............. 74/577 M

OTHER PUBLICATIONS

PCT International Search Report and Written Opinion Dated Jul. 31, 2009, Applicant Lear Corporation, Application No. PCT/US2009/047897.

* cited by examiner

*Primary Examiner* — Peter Brown
(74) *Attorney, Agent, or Firm* — Brooks Kushman P.C.

(57) ABSTRACT

A seat assembly for use with a vehicle includes a seat back that is mountable in the vehicle such that the seat is pivotable between a use position and a folded position. Furthermore, the seat back includes an engaging member. The seat assembly also includes a hinge assembly associated with the seat back. The hinge assembly includes a bracket that is attachable to the vehicle, a pivot member pivotally attached to the bracket, and a blocking member pivotally attached to the bracket. When a sufficient forward force is applied to the seat back, the pivot member pivots in a first direction about a first axis, which causes the blocking member to pivot in a second direction different than the first direction about a second axis and engage the engaging member, thereby blocking pivotal movement of the seat back. In this embodiment, the second axis is located forward of the first axis.

18 Claims, 4 Drawing Sheets

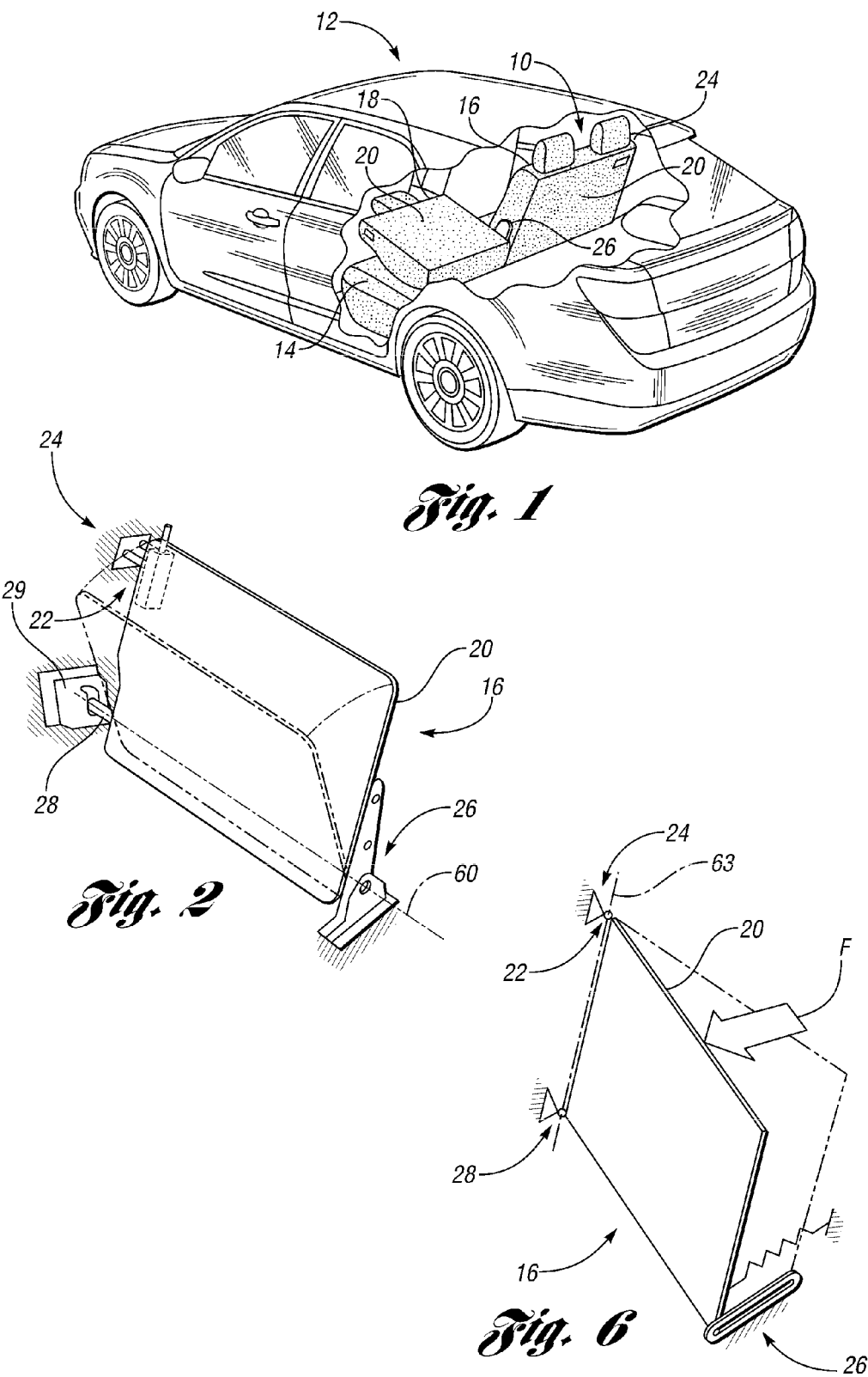

HINGE ASSEMBLY FOR A VEHICLE SEAT ASSEMBLY

CROSS-REFERENCE TO RELATED APPLICATION

This application is a U.S. national phase of PCT Appln. No. PCT/US2009/047897, filed Jun. 19, 2009, the disclosure of which is hereby incorporated by reference in its entirety.

BACKGROUND OF THE INVENTION

1. Field of the Invention

The invention relates to a hinge assembly for a vehicle seat assembly.

2. Background Art

A vehicle seat assembly may be provided with a hinge assembly for allowing a seat back to pivot from an upright position to a folded position. An example of such a seat assembly is disclosed in U.S. Pat. No. 5,673,971.

SUMMARY

In accordance with an embodiment of the present disclosure, a seat assembly for use with a vehicle includes a seat back that is mountable in the vehicle such that the seat is pivotable between a use position and a folded position. Furthermore, the seat back includes an engaging member. The seat assembly also includes a hinge assembly associated with the seat back. The hinge assembly includes a bracket that is attachable to the vehicle, a pivot member pivotally attached to the bracket, and a blocking member pivotally attached to the bracket. When a sufficient forward force is applied to the seat back, the pivot member pivots in a first direction about a first axis, which causes the blocking member to pivot in a second direction different than the first direction about a second axis and engage the engaging member, thereby blocking pivotal movement of the seat back. In this embodiment, the second axis is located forward of the first axis.

In accordance with another embodiment of the present disclosure, a seat assembly for use with a vehicle includes a seat back that is mountable in the vehicle such that the seat is pivotable between a use position and a folded position, and the seat back includes an engaging member. The seat assembly further includes a hinge assembly associated with the seat back. The hinge assembly includes a support member that is fixedly attachable to the vehicle, a pivot member pivotally associated with the support member, a blocking member pivotally associated with the support member, and a connecting member that extends through the support member and joins the pivot member to the seat back. When a sufficient force is applied to the seat back, the pivot member pivots in a first direction, which causes the blocking member to pivot in a second direction different than the first direction and engage the engaging member, thereby inhibiting pivotal movement of the seat back.

In accordance with yet another embodiment of the present disclosure, a seat assembly for use with a vehicle includes a seat back that is mountable in the vehicle such that the seat is pivotable between a use position and a folded position, and the seat back includes an engaging member. The seat assembly further includes a hinge assembly associated with the seat back. The hinge assembly includes a support member that is attachable to the vehicle, a movable member movably attached to the support member, a blocking member pivotally attached to the support member and associated with the movable member, and a spring member associated with the movable member. When a sufficient forward force is applied to the seat back, the movable member moves in a forward direction, which causes the blocking member to pivot and engage the engaging member, thereby blocking pivotal movement of the seat back. Furthermore, the spring member urges the movable member in a rearward direction.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a cut-away view of a vehicle having a seat assembly according to the present disclosure;

FIG. 2 is a perspective view of a seat back and hinge assembly of the seat assembly of FIG. 1;

FIG. 6 is a schematic view of the seat back and hinge assembly showing movement of the seat back as a result of application of a forward force on the seat back;

DETAILED DESCRIPTION

Figure 3:
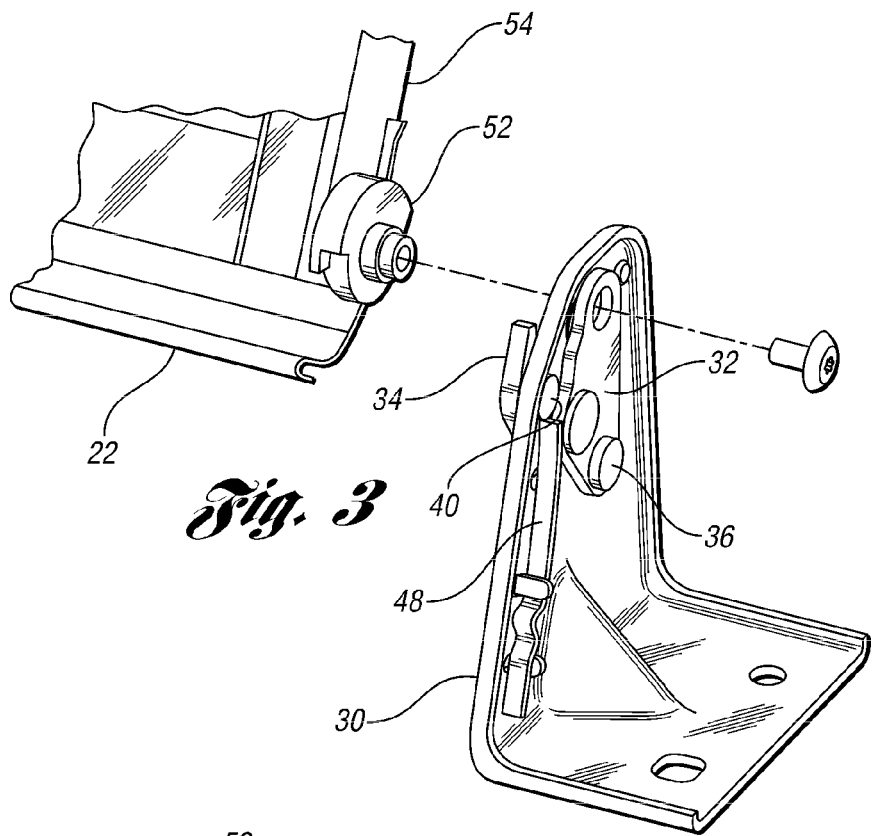
FIG. 3 is a perspective outboard view of an embodiment of the hinge assembly.

Several specific embodiments are set forth in the following description and in FIGS. 1-9 to provide a thorough understanding of certain embodiments according to the present disclosure. As those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without several of the specific features explained in the following description.

FIG. 1 shows a seat assembly 10 according to the present disclosure installed in a vehicle 12. In the embodiment shown, the seat assembly 10 is the rearmost seat assembly of the vehicle 12. In other embodiments, the seat assembly 10 may be an intermediate seat assembly or a front seat assembly.

In the embodiment shown in FIG. 1, the seat assembly 10 includes a seat bottom 14, or a pair of seat bottoms, and first and second folding seat backs 16 and 18, respectively. Each seat back 16 and 18 may be provided with a support portion or structure 20, such as a rigid panel or frame, and a seat latch or catch 22 attached to the support structure 20. Each seat catch 22 is engageable with a portion 24 of a vehicle body for securing the corresponding seat back 16, 18 in one or more upright or use positions.

The seat assembly 10 may further include a blocking hinge assembly 26 associated with each seat back 16 and 18. For example, each hinge assembly 26 may be attached to a respective support structure 20. As another example, the seat assembly 10 may be provided with one blocking hinge assembly 26 for one of the seat backs, such as seat back 16, and a non-blocking hinge assembly (not shown) for the other seat back, such as seat back 18.

Additional feature of the seat back 16 and hinge assembly 26 will now be discussed in greater detail with reference to FIGS. 2-7. It is to be understood that the seat back 18 and associated hinge assembly 26 may include the same or similar features.

Referring to FIG. 2, the seat back 16 includes a hinge pin 28 that is rotatably supported by a side support member 29, which is attached to the vehicle body. Under normal use conditions, the hinge assembly 26 and hinge pin 28 are configured to allow the seat back 16 to pivot between the use positions and a folded or stowed position when the seat catch 22 is released from the vehicle body portion 24. When a sufficient forward force is applied to the seat back 16 with the seat catch 22 secured to the vehicle body portion 24, however, the hinge assembly 26 is configured to block pivotal movement of the seat back 16, as explained below in detail.

Figure 4:
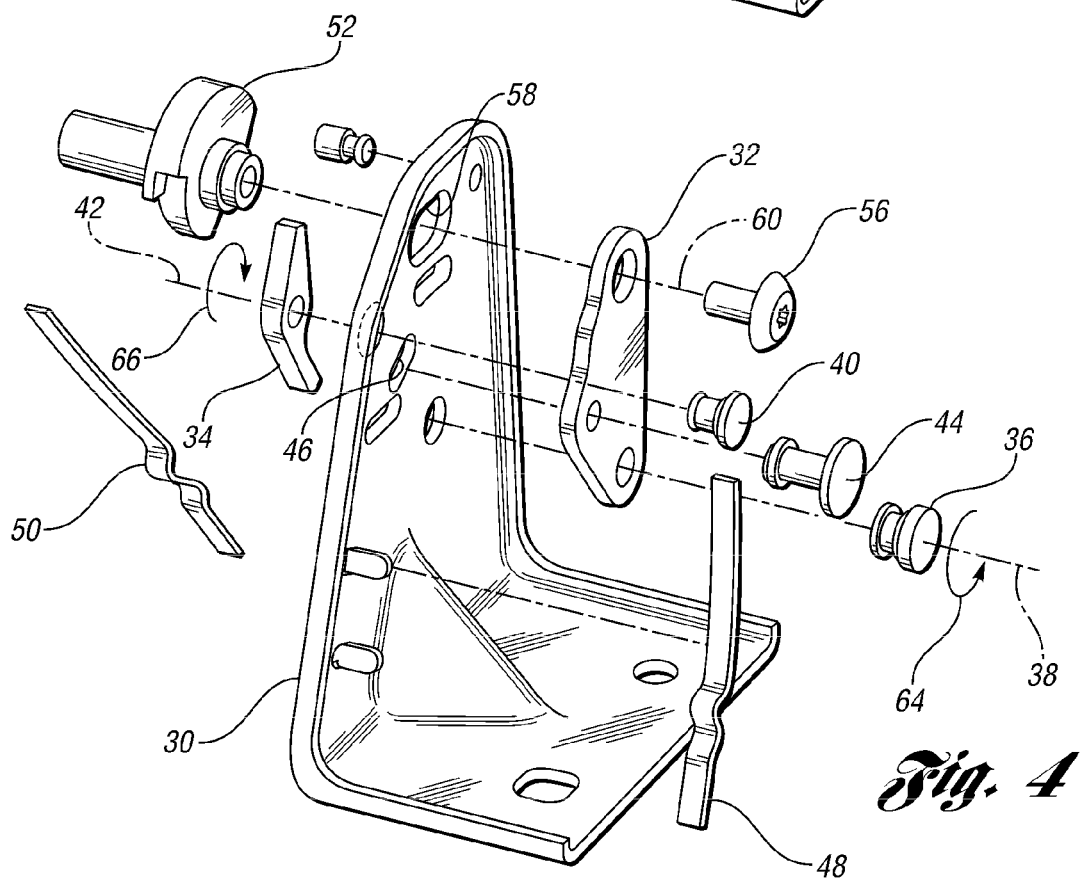
FIG. 4 is an exploded perspective view of the hinge assembly of FIG. 3.

Referring to FIGS. 3 and 4, the hinge assembly 26 may include a support member, such as a bracket 30, that is attachable to a floor or other portion of the vehicle body, a movable member, such as a pivot member 32, movably attached directly or indirectly to the bracket 30, and a blocking member 34 also movably attached directly or indirectly to the bracket 30. For example, the pivot member 32 may be pivotally connected to the bracket 30 with a first pivot pin 36 such that the pivot member 32 is pivotable about a first axis 38, and the blocking member 34 may be pivotally connected to the bracket 30 with a second pivot pin 40 such that the blocking member 34 is pivotable about a second axis 42.

The hinge assembly 26 further includes an engaging element 44 that extends between the pivot member 32 and the blocking member 34 for causing movement of the blocking member 34 when the pivot member 32 pivots. In the embodiment of FIGS. 3 and 4, the engaging element 44 is connected to the pivot member 32 and extends through an elongated opening, such as a first slot 46, in the bracket 30 such that the engaging element 44 is engageable with the blocking member 34. In another embodiment, the engaging element 44 may be connected to the blocking member 34 and may extend through the slot 46 such that the engaging element 44 is engageable with the pivot member 32.

Figure 5:
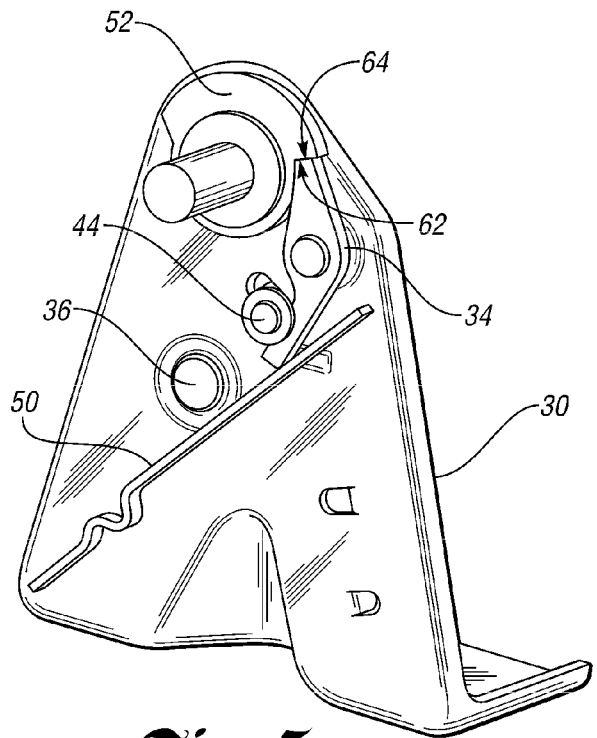
FIG. 5 is a perspective inboard view of the hinge assembly of FIG. 3.

Referring to FIGS. 3-5, the hinge assembly 26 also includes a first spring member 48 attached to the bracket 30 and engageable with the pivot member 32 for biasing the pivot member 32, and a second spring member 50 attached to the bracket 30 and engageable with the blocking member 34 for biasing the blocking member 34. The blocking member 34 is moveable against the bias of the second spring 50 and engageable with an engaging member 52 formed on the seat back 16, as shown in FIG. 5, to inhibit pivotal movement of the seat back 16 as explained below in detail.

The engaging member 52 may be integrally formed with the support structure 20 of the seat back 16, or attached directly or indirectly to the support structure 20, for example. In the embodiment shown in FIG. 3, the engaging member 52 is attached to an upper bracket 54, which is attachable to the support structure 20. The engaging member 52 may also be considered part of the hinge assembly 26.

Referring to FIGS. 3 and 4, the hinge assembly 26 further includes a connecting member 56 that extends through an elongated opening, such as a second slot 58, in the bracket 30 and connects the pivot member 32 to the seat back 16. For example, the connecting member 56 may be connected to the engaging member 52. Furthermore, the connecting member 56 moves with the pivot member 32 and along the slot 58 when the pivot member 32 pivots.

Referring to FIGS. 2 and 5-8, operation of the seat assembly 10 will now be described in more detail. When the hinge assembly 26 is in the normal use position or condition shown in FIG. 7, and the seat catch 22 shown in FIG. 2 is unlatched from the vehicle body portion 24, the seat back 16 is free to pivot about a third axis 60 that passes through the connecting member 56, for example. In the normal use condition, the blocking member 34 may be spaced sufficiently forward of the engaging member 52 so that an engaging surface 62 of the engaging member 52 may be rotated past a blocking surface 64 of the blocking member 34, thereby allowing the seat back 16 to be pivoted fully forward to the folded or stowed position.

Referring to FIG. 6, when a sufficient forward force F is applied to the seat back 16 with the seat catch 22 in a locked condition with respect to the vehicle body portion 24, the seat back 16 pivots forward about a generally upright axis 63. In addition, referring to FIG. 8, the pivot member 32 pivots in a first direction 64 about the first axis 38, which causes the connecting member 56 to slide forward along the slot 58 and thereby move the engaging member 52 slightly forward. Furthermore, pivotal movement of the pivot member 32 also causes the blocking member 34 to pivot in a second direction 66 different than the first direction about the second axis 42. As a result, the blocking surface 64 of the blocking member 34 engages the engaging surface 62 of the engaging member 52, as shown in FIGS. 5 and 8, thereby blocking pivotal movement of the seat back 16.

When the force F sufficiently reduces, the first spring member 48 causes the pivot member 32 to rotate rearwardly, such that the pivot member 32 moves the connecting member 56 and engaging member 52 rearwardly, and also causes the blocking member 34 to pivot in a direction opposite the second direction 66. As a result, the blocking member 34 disengages the engaging member 52 and the hinge assembly 26 returns to the normal use condition shown in FIG. 7.

Figures 7, 8:
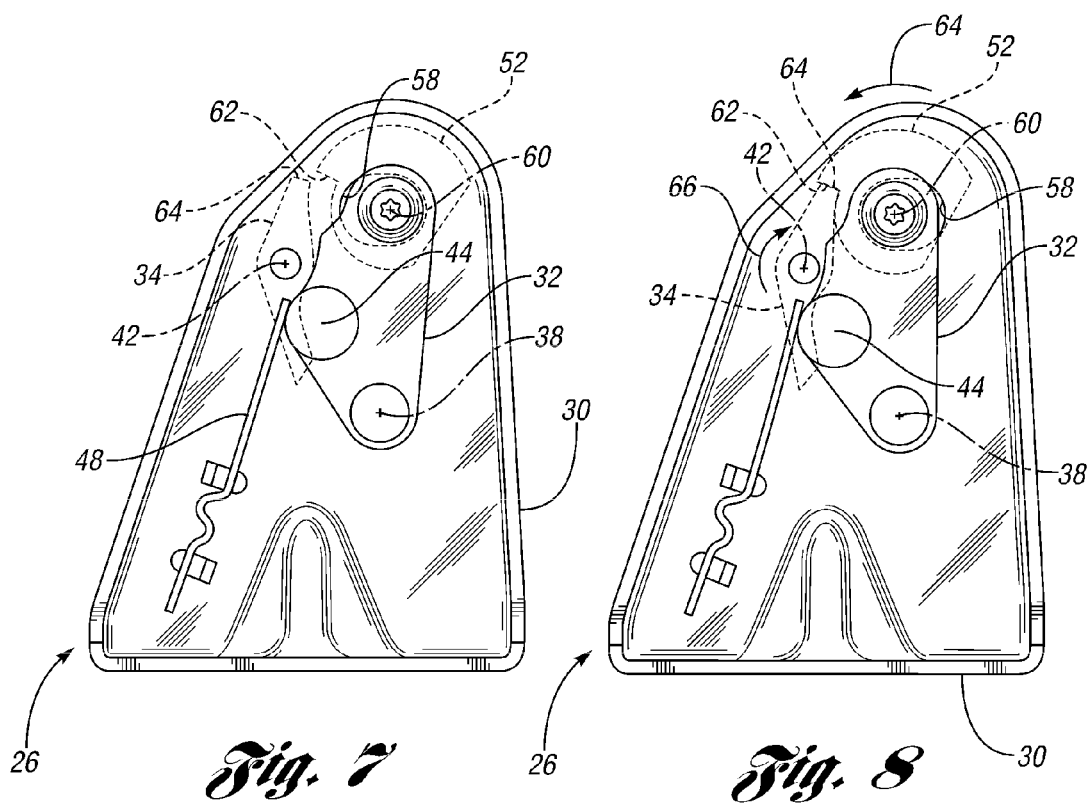
FIG. 7 is a side view of the hinge assembly in a normal use condition.
FIG. 8 is a side view of the hinge assembly in a blocking position.

In the embodiment shown in FIGS. 7 and 8, the second axis 42 is located forward of the first axis 38. Furthermore, when the hinge assembly 26 is in the normal use condition shown in FIG. 7, the third axis 60 is located slightly rearward of the first axis 38. In the view shown in FIG. 8, the first direction 64 is counterclockwise, and the second direction 66 is clockwise.

Returning to FIGS. 3 and 4, the first spring member 48 is engageable with the pivot member 32 for urging the pivot member 32 in a direction opposite the first direction 64. For example, the spring member 48 may be a leaf spring that engages a front portion of the pivot member 32 and urges the pivot member 32 rearwardly. As another example, the first spring member 48 may be a coil spring connected to a rear portion of the pivot member 32 and that urges the pivot member 32 rearwardly.

Referring to FIG. 5, the second spring member 50 is engageable with the blocking member 34 for urging the blocking member 34 in a direction opposite the second direction 66. For example, the second spring member 50 may be a leaf spring that engages a bottom front portion of the blocking member 34 and urges the bottom front portion rearwardly.

Figure 9:
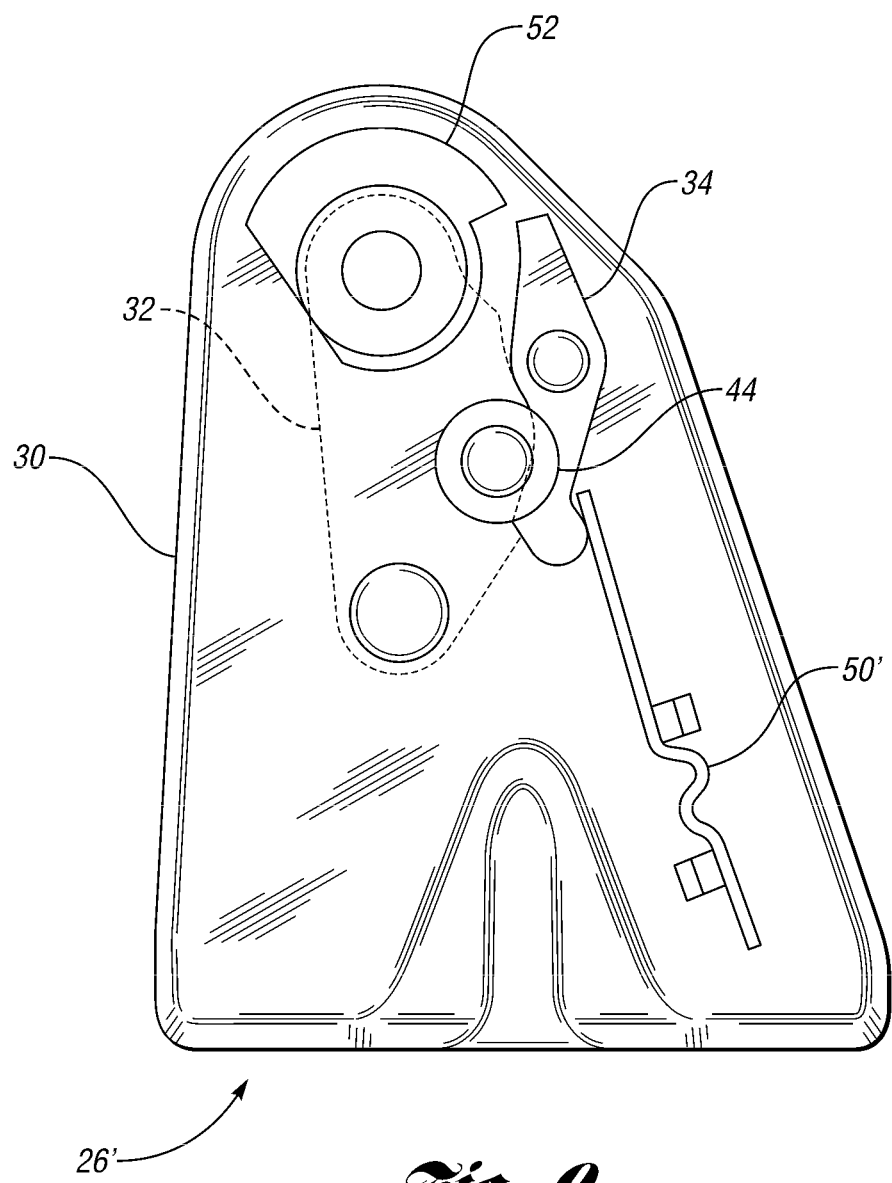
FIG. 9 is an inboard side view of a second embodiment of a hinges assembly according to the present disclosure.

FIG. 9 shows another embodiment 26' of the hinge assembly according to the present disclosure. The hinge assembly 26' includes a spring member 50' attached to the bracket 30 and engaged with the blocking member 34, but does not include a spring member engaged directly with the pivot member 32. In this embodiment, the spring member 50' is engaged with a bottom front projecting portion on the blocking member 34 and urges the projecting portion rearward. As a result, the blocking member 34 urges the pivot member 32 rearward via the engaging element 44. The other features and function of the hinge assembly 26' may be the same as or similar to the features and function of the hinge assembly 26.

The hinge assembly components can be made of any suitable material and in any suitable manner. For example, the bracket 30, pivot member 32 and blocking member 34 may be stamped from sheet steel or aluminum. Hinge assemblies according to the present disclosure may provide cost and weight savings compared to prior structures.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat assembly for use with a vehicle, the seat assembly comprising:
    a seat back that is mountable in the vehicle such that the seat back is pivotable between a use position and a folded position, the seat back including an engaging member; and
    a hinge assembly associated with the seat back, the hinge assembly including a bracket that is attachable to the vehicle, a pivot member pivotally attached to the bracket, a blocking member pivotally attached to the bracket, a connecting member that connects the pivot member to the seat back, and an engaging element that is connected to one of the pivot member and the blocking member and engageable with the other of the pivot member and the blocking member such that movement of the pivot member causes movement of the blocking member, wherein when a sufficient forward force is applied to the seat back, the seat back and connecting member are configured to move with respect to the bracket to cause the pivot member to pivot in a first direction about a first axis to cause the blocking member to pivot in a second direction different than the first direction about a second axis and engage the engaging member, to thereby block pivotal movement of the seat back, and wherein the second axis is located forward of the first axis.

2. The seat assembly of claim 1 wherein the hinge assembly is configured to allow the seat back to pivot between the use position and the folded position during normal use.

3. The seat assembly of claim 2 wherein the connecting member extends through a slot in the bracket, and wherein the connecting member is configured to move with the pivot member and along the slot when the pivot member pivots in the first direction.

4. The seat assembly of claim 3 wherein the connecting member is connected to the engaging member.

5. The seat assembly of claim 1 wherein the hinge assembly includes a spring member associated with the pivot member for urging the pivot member in a direction opposite the first direction.

6. The seat assembly of claim 1 wherein the second direction is opposite the first direction.

7. The seat assembly of claim 1 further comprising a spring member associated with the pivot member, wherein the spring member is configured to urge the pivot member rearwardly to facilitate disengagement of the blocking member from the engaging member upon sufficient reduction of the forward force.

8. The seat assembly of claim 1 wherein the engaging element extends through an opening in the bracket.

9. The seat assembly of claim 1 wherein the connecting member extends through a first slot in the bracket and is movable along the first slot, and the engaging element extends through a second slot in the bracket.

10. A seat assembly for use with a vehicle, the seat assembly comprising:
    a seat back that is mountable in the vehicle such that the seat is pivotable between a use position and a folded position, the seat back including an engaging member; and
    a hinge assembly associated with the seat back, the hinge assembly including a support member that is fixedly attachable to the vehicle, a pivot member pivotally associated with the support member, a blocking member pivotally associated with the support member, and a connecting member that extends through the support member and joins the pivot member to the seat back, wherein when a sufficient force is applied to the seat back, the seat back and connecting member are configured to move with respect to the support member to cause the pivot member to pivot with respect to the support member in a first direction to cause the blocking member to pivot with respect to the support member in a second direction different than the first direction and engage the engaging member, to thereby inhibit pivotal movement of the seat back.

11. The seat assembly of claim 10 wherein the support member includes a slot that receives the connecting member, and wherein the slot is configured to allow forward and rearward movement of the connecting member.

12. The seat assembly of claim 10 wherein the hinge assembly is configured to allow the seat back to pivot between the use position and the folded position during normal use.

13. The seat assembly of claim 10 wherein the hinge assembly further includes an engaging element connected to the pivot member and extending through an opening in the support member, and wherein the engaging element is engageable with the blocking member to cause the blocking member to pivot in the second direction when the pivot member pivots in the first direction.

14. A seat assembly for use with a vehicle, the seat assembly comprising:
    a seat back that is mountable in the vehicle such that the seat back is pivotable between a use position and a folded position, the seat back including an engaging member; and
    a hinge assembly associated with the seat back, the hinge assembly including a support member that is attachable to the vehicle, a movable member movably attached to the support member, a blocking member pivotally attached to the support member and associated with the movable member, a spring member associated with the movable member, and a connecting member that connects the movable member to the seat back, wherein when a sufficient forward force is applied to the seat back, the seat back and connecting member are configured to move with respect to the support member to cause the movable member to move in a forward direction to cause the blocking member to pivot and engage the engaging member to thereby block pivotal movement of the seat back, and wherein the spring member is configured to urge the movable member in a rearward direction to facilitate disengagement of the blocking member from the engaging member upon sufficient reduction of the forward force.

15. The seat assembly of claim 14 wherein the spring member is engaged with the movable member.

16. The seat assembly of claim 14 wherein the spring member is engaged with the blocking member.

17. The seat assembly of claim 14 wherein the hinge assembly includes an engaging element that is connected to one of the movable member and the blocking member and engageable with the other of the movable member and the blocking member such that movement of the movable member in the forward direction causes movement of the blocking member.

18. The seat assembly of claim 17 wherein the connecting member extends through a slot in the support member, and wherein the connecting member is configured to move along the slot when the movable member moves in the forward direction.

* * * * *